US012184095B2

United States Patent
Rosu-Hamzescu et al.

(10) Patent No.: US 12,184,095 B2
(45) Date of Patent: Dec. 31, 2024

(54) FREQUENCY SHIFT KEYING DEMODULATION FOR WIRELESS POWER AND RELATED SYSTEMS, METHODS, AND DEVICES

(71) Applicant: Microchip Technology Incorporated, Chandler, AZ (US)

(72) Inventors: Mihnea Rosu-Hamzescu, Bucharest (RO); Sergiu Oprea, Bucharest (RO); Marius Dracea, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 562 days.

(21) Appl. No.: 17/445,298

(22) Filed: Aug. 17, 2021

(65) Prior Publication Data
US 2022/0060062 A1 Feb. 24, 2022

Related U.S. Application Data (60) Provisional application No. 62/706,464, filed on Aug. 18, 2020.

(51) Int. Cl.
*H02J 50/80* (2016.01)
*H02J 7/00* (2006.01)
*H02J 50/10* (2016.01)

(52) U.S. Cl.
CPC .......... *H02J 50/80* (2016.02); *H02J 7/00036* (2020.01); *H02J 50/10* (2016.02); *H02J 2207/20* (2020.01)

(58) Field of Classification Search
CPC .... H02J 50/80; H02J 7/00036; H02J 2207/20; H02J 50/00; H04B 5/79; H04B 5/0037
(Continued)

(56) References Cited

U.S. PATENT DOCUMENTS 4,468,792 A * 8/1984 Baker ................... H04L 27/103
 375/272
7,881,409 B2 * 2/2011 Ghovanloo ............ H03D 3/006
 375/334
(Continued)

FOREIGN PATENT DOCUMENTS

CN 101939958 A 1/2011
CN 105897639 A 8/2016
(Continued)

OTHER PUBLICATIONS

International Invitation to Pay Additional Fees from International Application No. PCT/US2021/071216, mailed Dec. 3, 2021, 11 pages.
(Continued)

*Primary Examiner* — M Baye Diao
(74) *Attorney, Agent, or Firm* — TraskBritt (57) ABSTRACT

Frequency shift keying (FSK) demodulation for wireless power and related systems, methods, and devices is disclosed. An apparatus for a wireless power receiver includes a timing circuit and a processing core separate from the timing circuit. The timing circuit is to obtain a timer count every predetermined number of like edges of a frequency shift keying (FSK) wireless power signal. The FSK wireless power signal is to communicate data bits. The processing core is to determine the data bits of the FSK wireless power signal responsive to the obtained timer counts.

21 Claims, 5 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 8,712,245 | B1* | 4/2014 | Alao | G08C 23/04 |
| | | | | 398/118 |
| 9,225,568 | B1* | 12/2015 | Mei | H04L 27/1563 |
| 9,400,903 | B2* | 7/2016 | Wang | G06F 21/83 |
| 9,893,771 | B2* | 2/2018 | Sui | H04B 5/24 |
| 9,960,643 | B2* | 5/2018 | Gao | H02J 7/00036 |
| 11,824,375 | B2* | 11/2023 | AbuKhalaf | H02J 7/007182 |
| 2004/0021483 | A1* | 2/2004 | Boles | G06F 30/39 |
| | | | | 326/63 |
| 2009/0096519 | A1* | 4/2009 | El-Agha | H03D 3/006 |
| | | | | 329/300 |
| 2009/0168857 | A1 | 7/2009 | Golborne et al. | |
| 2013/0051449 | A1* | 2/2013 | Georgi | H04L 25/03159 |
| | | | | 375/303 |
| 2013/0260676 | A1 | 10/2013 | Singh | |
| 2016/0190816 | A1* | 6/2016 | Rehm | H02J 50/12 |
| | | | | 307/104 |
| 2016/0336785 | A1 | 11/2016 | Gao et al. | |
| 2022/0006330 | A1* | 1/2022 | AbuKhalaf | H02J 7/007182 |

FOREIGN PATENT DOCUMENTS

| | | |
|---|---|---|
| CN | 106569032 A | 4/2017 |
| CN | 109120564 A | 1/2019 |
| CN | 110896311 A | 3/2020 |
| WO | 2004/095364 A2 | 11/2004 |
| WO | 2020/038363 A1 | 2/2020 |

OTHER PUBLICATIONS

International Search Report from International Application No. PCT/US2021/071216, mailed Jan. 24, 2022, 6 pages.
International Written Opinion from International Application No. PCT/US2021/071216, mailed Jan. 24, 2022, 11 pages.
Chinese First Office Action and Search Report of Chinese Patent Application No. 202180055655.7, issued Mar. 18, 2024, 24 pages with English translation.

* cited by examiner

FREQUENCY SHIFT KEYING DEMODULATION FOR WIRELESS POWER AND RELATED SYSTEMS, METHODS, AND DEVICES

CROSS-REFERENCE TO RELATED APPLICATIONS

This application claims the benefit under 35 U.S.C. § 119(e) of U.S. Provisional Patent Application Ser. No. 62/706,464, filed Aug. 18, 2020, entitled "LOW PROCESSING POWER FREQUENCY SHIFT KEYING DEMODULATION FOR WIRELESS POWER AND RELATED SYSTEMS, METHODS, AND DEVICES," the disclosure of which is hereby incorporated herein in its entirety by this reference.

TECHNICAL FIELD

This disclosure relates generally to demodulation of frequency shift keying (FSK) signals, and more particularly to FSK demodulation for wireless power signals.

BACKGROUND

Qi charging is a standard for wireless power transfer promoted by the Wireless Power Consortium (WPC). Currently, this standard is supported by many companies and products that conform to the standard, making Qi the wireless charging choice for portable consumer electronics.

Wireless power transfer uses the principle of magnetic induction to transfer power. The principle of operation of wireless power transfer is similar to that of a conventional alternating current (AC) transformer, with the receiver coils and the transmitter coils similar to the transformer windings. One difference between wireless power transfer and an AC transformer is that an AC transformer generally includes strongly coupled coils on a magnetic core, while a wireless power transmitter (e.g., a wireless charger) generally includes loosely coupled coils (e.g., coupling coefficient<0.5, without limitation) and the electromagnetic field transfers through air or other non-metallic materials and non-ferrous materials (plastic, wood, glass) in wireless power transfer.

Two-way communication is a requirement for the Qi 1.2 protocol. The communication from a wireless power receiver to the wireless power transmitter may be implemented using amplitude shift keying (ASK), as recommended by the standard. The communication from the wireless power transmitter to the wireless power receiver is implemented using frequency shift keying (FSK).

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations, and the like, have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As previously mentioned, two-way communication is a requirement for the Qi 1.2 protocol. More specifically, medium power profile wireless power receivers (e.g., 15-Watt wireless power receivers) introduced in version 1.2 of the Qi standard use two-way communication with the charging station (a wireless power transmitter). Communications transmitted from the charging station to the wireless power receiver are communicated using FSK modulation of the wireless power signal. The wireless power receiver demodulates data packets on a frequency range of between substantially 85 kilohertz (kHz) and 205 kHz. A controller (e.g., a microcontroller) capable of sampling and processing the wireless power signal to demodulate the data packets from the wireless power signal may be a relatively powerful microcontroller (e.g., a sixteen-bit or higher microcontroller), i.e., those with relatively high processing power, which may be relatively expensive as compared to less powerful microcontrollers (e.g., less than sixteen-bit microcontrollers such as eight-bit microcontrollers), i.e., those with relatively low processing power. Conventional FSK demodulation techniques may not be implemented on a relatively low processing power controller, or microcontroller, because relatively low processing power controllers typically do not operate at a high enough clock frequency and do not have sufficient processing power to demodulate FSK signals of substantially 85 kHz to 205 kHz.

Disclosed herein are controllers having low processing power (e.g., less than sixteen-bit microcontrollers such as eight-bit microcontrollers) and that are capable of demodulating data packets communicating using FSK modulation on wireless power signals from wireless power transmitters. As used herein, the term "low processing power" when used with reference to a microcontroller or other processing circuit refers to a processing power of substantially ten million instructions per second (MIPS) or less. A non-limiting example of a low processing power microcontroller may be an eight-bit microcontroller running at sixteen megahertz (16 MHz), which may have substantially a four MIPS processing power. It should be noted that examples disclosed herein may be implemented using high processing power processing circuits (e.g., greater than substantially ten MIPS) without departing from embodiments disclosed herein and thereby perform FSK demodulation using reduced processing resources as compared to known FSK demodulation methods. Examples disclosed herein include microcontrollers including a processing core and a timing circuit such as a peripheral (e.g., a multi-function peripheral having a capture mode, a compare mode, and a pulse-width-modulation mode, sometimes referred to herein as a "capture/compare/pulse-width-modulation (CCP) peripheral," without limitation). Rather than use a processing core itself to directly detect the modulated frequency of a wireless power signal, examples disclosed herein use a timing circuit to detect timing data indicating numbers of timer cycles between edges of the wireless power signal. The processing core uses the timing data to determine the modulation frequency of the wireless power signal and determine the data bits communicated by the wireless power signal.

A CCP based, averaged frequency discriminator enables inference of modulated frequencies of FSK wireless power signals without directly monitoring and processing the FSK wireless power signals. A Qi protocol FSK encoded bit time is long enough to allow average CCP readings and greatly reduce usage of a processing core. Accuracy depends primarily on the accuracy of a clock source. As a specific non-limiting example, when a 1% internal oscillator is used no calibration may be needed to provide a high level of accuracy. Such CCP based, averaged frequency discriminators may be implemented on relatively low processing power microcontrollers. As a result, relatively low processing power microcontrollers may function as Qi 1.2 power receivers with minimal peripheral requirements and moderate processing core usage.

In some examples, an apparatus for a wireless power receiver includes a timing circuit and a processing core separate from the timing circuit. The timing circuit is to obtain a timer count every predetermined number of like edges of an FSK wireless power signal received from a wireless power transmitter. The FSK wireless power signal is to communicate data bits. The processing core is to determine the data bits of the FSK wireless power signal responsive to the obtained timer counts. In some examples, the timing circuit is implemented as a multi-function peripheral selectively operable, responsive to the processing core, selectively operable in one of a capture mode, a compare mode, and a pulse-width-modulation mode. In some examples, the multi-function peripheral is operable in the capture mode to generate the timing data. In some examples, the multi-function peripheral outputs an interrupt to the processing core every predetermined number of like edges of the FSK wireless power signal. In some examples, the processing core samples the respective obtained timer count responsive to the interrupt. In some examples, the processing core is a processing core of a microcontroller of less than sixteen bits. In some examples, the microcontroller is an eight-bit microcontroller. In some examples, a frequency of the FSK wireless power signal is between substantially 85 kilohertz and 205 kilohertz. In some examples, the FSK wireless power signal is encoded using a differential Manchester code.

In some examples, a method of operating a wireless power receiver includes receiving an FSK wireless power signal from a wireless power transmitter. The FSK wireless power signal is to communicate data bits. The method also includes obtaining a timer count every predetermined number of like edges of the FSK wireless power signal. The method also includes providing the obtained timer counts to a processing core and determining, by the processing core, the data bits of the FSK wireless power signal responsive to the obtained timer counts.

In some examples, a method of operating a wireless power receiver includes setting, with a processing core, a multi-function peripheral to operate in a capture mode. The method also includes receiving, with the multi-function peripheral, a frequency shift keying (FSK) wireless power signal from a wireless power transmitter. The method further includes obtaining a timer count every predetermined number of like edges of the measurement signal. In some examples, obtaining the timer count every predetermined number of like edges of the measurement signal includes obtaining the timer count of a free running counter of the multi-function peripheral. The method further includes triggering, with the multi-function peripheral, an interrupt of the processing core for every predetermined number of like edges of the measurement signal. In some examples, the predetermined number of like edges of the measurement signal is sixteen. The method also includes reading, by the processing core responsive to a triggered interrupt, the obtained timer counts, and determining, by the processing core, a demodulated signal corresponding to the FSK wireless power signal responsive to the obtained timer counts.

In some examples, a wireless power receiver includes a receive coil and a microcontroller electrically connected to the receive coil. The receive coil is to receive a frequency shift keying (FSK) wireless power signal from a wireless power transmitter. The FSK wireless power signal is to communicate data bits. The microcontroller includes a timing circuit and a processing core. The timing circuit is to generate timing information regarding a predetermined number of like edges of the FSK wireless power signal. The processing core is to determine the data bits of the FSK wireless power signal responsive to the timing information. In some examples, the timing circuit includes a multi-function peripheral, wherein the microcontroller is to set the multi-function peripheral to a capture mode to thereby enable the generation of the timing information. In some examples, the microcontroller is an eight-bit microcontroller.

Figure 1:
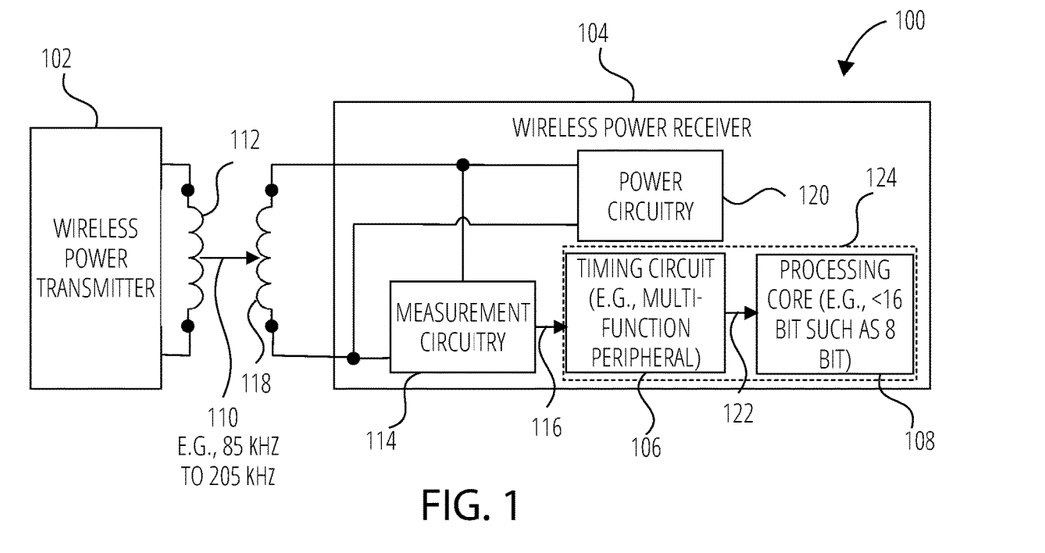
FIG. 1 is a block diagram of a wireless power transmission communication system, according to various examples.

FIG. 1 is a block diagram of a wireless power transmission communication system 100, according to various examples. The wireless power transmission communication system 100 includes a wireless power transmitter 102 and a wireless power receiver 104. The wireless power transmitter 102 provides an FSK wireless power signal 110 from a transmit coil 112 of the wireless power transmitter 102 to a receive coil 118 of the wireless power receiver 104. The FSK wireless power signal 110 may be similar to an FSK wireless power signal 300 of FIG. 3, which may be modulated using a differential Manchester signal 200 of FIG. 2 to communicate data bits, as will be discussed in more detail below.

The wireless power receiver 104 receives, using the receive coil 118, the FSK wireless power signal 110 and extracts power and data from the FSK wireless power signal 110. The wireless power receiver 104 includes power circuitry 120 to receive the FSK wireless power signal 110 and extract the power. By way of non-limiting example, the power circuitry 120 may include a rectifier (e.g., a diode rectifier) to convert the FSK wireless power signal 110 to a direct current (DC) power signal. Also, by way of non-limiting example, the power circuitry 120 may include a voltage regulator to regulate a DC power signal provided by a rectifier. As another non-limiting example, the power circuitry 120 may include a battery (e.g., a rechargeable battery, without limitation) and a charging circuitry to control charging of the battery using a regulated power signal from a voltage regulator.

The wireless power receiver 104 also includes measurement circuitry 114 to generate a measurement signal 116 responsive to the FSK wireless power signal 110. By way of non-limiting example, the measurement circuitry 114 may include a resonant tank circuit, which may include the receive coil 118 and one or more other reactive elements (e.g., one or more capacitors, without limitation). Also, by way of non-limiting example, the measurement circuitry 114 may include step down circuitry (e.g., a resistive divider, without limitation) to attenuate an amplitude of the measurement signal 116 as compared to the FSK wireless power signal 110 to a range that is within a specified range for input to timing circuit 106 of the wireless power receiver 104. As a result, the measurement signal 116 may be similar to the FSK wireless power signal 110 except that the measurement signal 116 may have a lower amplitude as compared to that of the FSK wireless power signal 110. The measurement circuitry 114 provides the measurement signal 116 to the timing circuit 106.

The timing circuit 106 generates timing data 122 responsive to the received measurement signal 116. The timing data 122 indicates timing between like edges (e.g., rising edges or falling edges) of the measurement signal 116, which corresponds to timing between like edges of the FSK wireless power signal 110. By way of non-limiting example, the timing circuit 106 may be implemented as a peripheral (e.g., a multi-function peripheral operable in a capture mode, a compare mode, and a pulse-width modulation mode, without limitation). Also by way of non-limiting example, the peripheral may be operated in the capture mode to generate the timing data 122.

The wireless power receiver 104 includes a processing core 108 separate from the timing circuit 106. The processing core 108 is to determine the data bits communicated by the FSK wireless power signal 110 responsive to the timing data 122 (e.g., responsive to the timing between the like edges of the FSK wireless power signal, or responsive to averages of the timing between the like edges of the FSK wireless power signal over multiple sampling intervals. By way of non-limiting example, the timing circuit 106 (e.g., a multi-function peripheral, without limitation) may trigger an interrupt of the processing core 108 every sixth edge of the FSK wireless power signal 110. As another non-limiting example, the processing core 108 may sample the timing data 122 responsive to the interrupt. In various examples the processing core 108 may be a processing core of a microcontroller with low processing power, such as a microcontroller of less than sixteen bits (e.g., an eight-bit microcontroller, without limitation). In various examples the microcontroller 124 includes the timing circuit 106 and the processing core 108, wherein the timing circuit 106 is a peripheral of the processing core 108 and is separate from the processing core 108.

Figure 2:
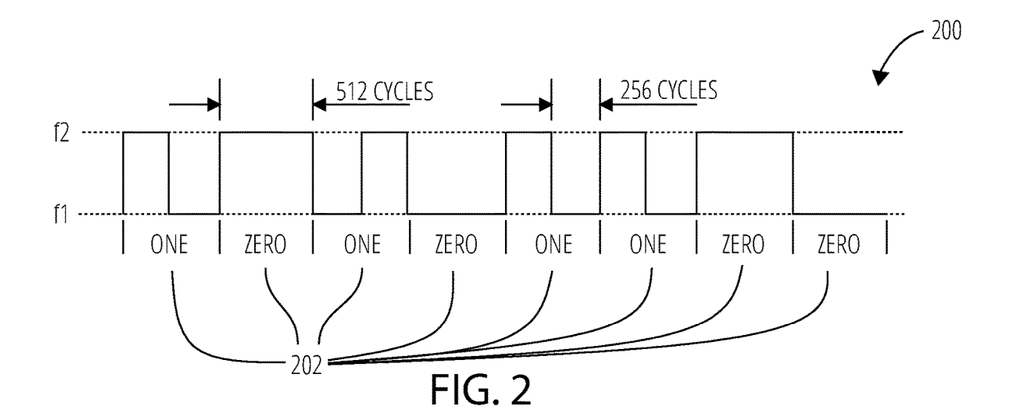
FIG. 2 is a frequency plot illustrating frequencies of an FSK wireless power signal, according to some examples.

FIG. 2 is a plot of a differential Manchester signal 200 illustrating transitions between frequencies f1 and f2 of an FSK wireless power signal 300 (FIG. 3), according to some examples. A wireless power receiver may receive incoming data on an FSK wireless power signal 300. By way of non-limiting example, the incoming data may be encoded using a differential Manchester code (e.g., the differential Manchester signal 200 of FIG. 2). Different logic levels of the differential Manchester signal 200 correspond to discreet frequencies f1 and f2 in the FSK wireless power signal 300. By way of non-limiting example, frequency f1 may be an operational frequency and frequency f2 may be a modulated frequency.

FIG. 2 illustrates eight bits 202 of data. According to differential Manchester encoding the differential Manchester signal 200 includes transitions between the logic levels at edges between bits 202. Also, by way of non-limiting example, a digital "one" may be communicated where a transition between the logic levels occurs between the edges between the bits 202. As a further non-limiting example, a digital "zero" may be communicated where no transition between the logic levels occurs between the edges between the bits 202. In the example illustrated in FIG. 2, the differential Manchester signal 200 may communicate "one," "zero" "one," "zero" "one," "one" "zero," "zero."

Figure 3:
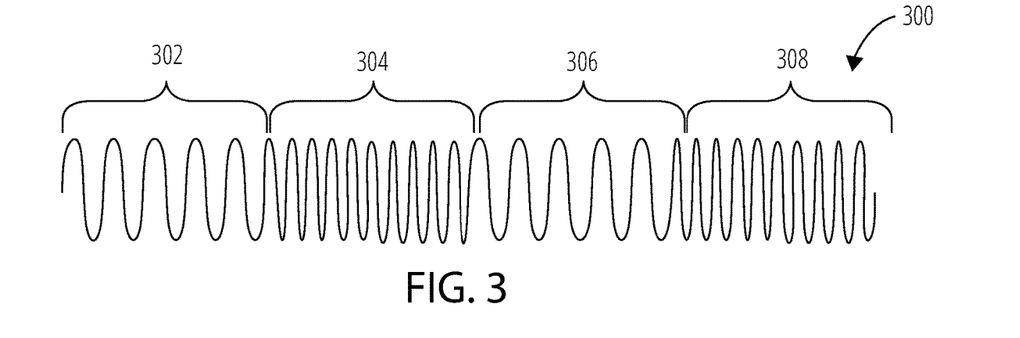
FIG. 3 is a plot of an FSK wireless power signal, according to some examples.

The operating frequency may not change during data reception by a wireless power receiver receiving the FSK wireless power signal 300. By way of non-limiting example, each bit may be 512 frequency cycles of the operating frequency long. A half-bit may be 256 frequency cycles of the operating frequency long. As a result, one transition in frequency per bit time codes a "zero" and two transitions in frequency per bit time codes a "one." By way of non-limiting example, a wireless power receiver (e.g., the wireless power receiver 104 of FIG. 1, without limitation) discriminates signal period differences of at least 250 nanoseconds (ns), which is the maximum allowed modulation of the present Qi 1.2 standard.

FIG. 3 is a plot of an FSK wireless power signal 300, according to some examples. The FSK wireless power signal 300 may be an example of the FSK wireless power signal 110 of FIG. 1, without limitation. Also, as discussed above, the measurement signal 116 of FIG. 1 may be similar to the FSK wireless power signal 110 except for a difference in signal amplitude. As a result, a separate illustration of a measurement signal corresponding to the FSK wireless power signal 300 is not provided herewith because such a separate illustration would be substantially the same as FIG. 3. The FSK wireless power signal 300 is plotted on a different timescale from that of the differential Manchester signal 200. Accordingly, the differential Manchester signal 200 of FIG. 2 corresponds to a different and longer segment of the differential FSK wireless power signal 300 of FIG. 3 than is illustrated in FIG. 3. A shorter segment of the FSK wireless power signal 300 is shown in FIG. 3 to better illustrate different frequencies of the FSK wireless power signal 300.

The segment of the FSK wireless power signal 300 illustrated in FIG. 3 includes a first segment 302, a second segment 304, a third segment 306, and a fourth segment 308. The first segment 302 and the third segment 306 oscillate at a first frequency (e.g., f1 of FIG. 2), which may be an operational frequency of the FSK wireless power signal 300. In other words, the first frequency may be a main power transfer frequency of the FSK wireless power signal 300. The second segment 304 and the fourth segment 308 oscillate at a second frequency (e.g., f2 of FIG. 2), which is different from the first frequency. The first frequency and the second frequency correspond to different logic levels of the differential Manchester signal 200, as discussed with reference to FIG. 2. In some examples, the first frequency may correspond to the low logic level (f1) of FIG. 2 and the second frequency may correspond to the high logic level (f2) of FIG. 2. In some examples, the second frequency may correspond to the low logic level (f1) of FIG. 2 and the first frequency may correspond to the high logic level (f2) of FIG. 2.

The FSK wireless power signal 300 is modulated using a differential Manchester signal (e.g., the differential Manchester signal 200 of FIG. 2). A multi-function peripheral (e.g., a CCP peripheral) in capture mode outputs an interrupt every predetermined number of timer cycles (e.g., every 16th like edge of measurement signal 116, such as either rising edges or falling edges, without limitation). In further explanation, in capture mode, the CCP peripheral retrieves a timer value based on a signal event, with a signal event defined in relation to an edge of measurement signal 116, which is coupled to an input of the CCP peripheral. The timer value may be based on a free running timer that advances based on an internal clock signal of microcontroller 124. A 256 cycle half-bit having an interrupt every 16th like edge of measurement signal 116 would have 16 interrupts per half-bit. Intervals of time between interrupts may be referred to as "sampling intervals." The multi-function peripheral may store the timer value in response to the 16 like edge of the measurement signal 116 and output an interrupt to the processing core 108. When expecting a data packet, firmware (e.g., the processing core 108 executing the firmware) may, in response to receipt of the interrupt from the timing circuit 106, read the timer stored for each half-bit from the register, and determine the frequency of a current half-bit of the FSK wireless power signal 300 and/or its corresponding measurement signal 116 based, at least in part, on the present timer value, the previous timer value, and the frequency of the internal clock signal of microcontroller 124 utilized by the free running timer. By way of non-limiting example, if the frequency of the FSK wireless power signal 300 is low (e.g., the first frequency corresponding to the first segment 302 and the third segment 306), the number of clock cycles between like edges of the FSK wireless power signal 300, i.e., the difference between the present timer value and the previous timer value, will be high. If the frequency of the FSK wireless power signal 300 is high (e.g., the second frequency corresponding to the second segment 304 and the fourth segment 308), the number of clock cycles between like edges of the FSK wireless power signal 300, i.e., the difference between the present timer value and the previous timer value, will be low. A start of a data packet may be detected by detecting the first segment 302 of the FSK wireless power signal 300 and/or its corresponding measurement signal (e.g., a first sampling interval). Depending on the detected start of the first sampling interval, at least 15 out of 16 sampling intervals in a half-bit should yield the expected (correct) frequency. Based on the frequency of each half-bit (e.g., each including a predetermined number of sampling intervals such as 16 sampling intervals), the firmware (e.g., the processing core) can reconstruct the packet information.

The above has been described in an embodiment where the multi-function peripheral is set to output an interrupt and store a timer value every 16th like edge, however this is not meant to be limiting in any way. Other values may be used, providing more frequent, or less frequent, interrupts and timer values to processing core 108.

A CCP interrupt may only be output at a maximum frequency of 205 kHz divided by 16, which is 12.8125 kHz, according to various examples. Test have shown that implementing FSK demodulation of an FSK wireless power signal such as the FSK wireless power signal 300 using an eight-bit enhanced core microcontroller running on a 16-megahertz (MHz) clock used around 30% of the available processing power of the eight-bit enhanced core microcontroller when receiving data. The eight-bit enhanced core usage may be less than 30% when not receiving data. This allows the microcontroller to modulate and demodulate a wireless power signal for bi-directional communication with a wireless power transmitter, operate 2PI loops for voltage and/or current control, and operate a lithium-ion battery state machine.

Figure 4:
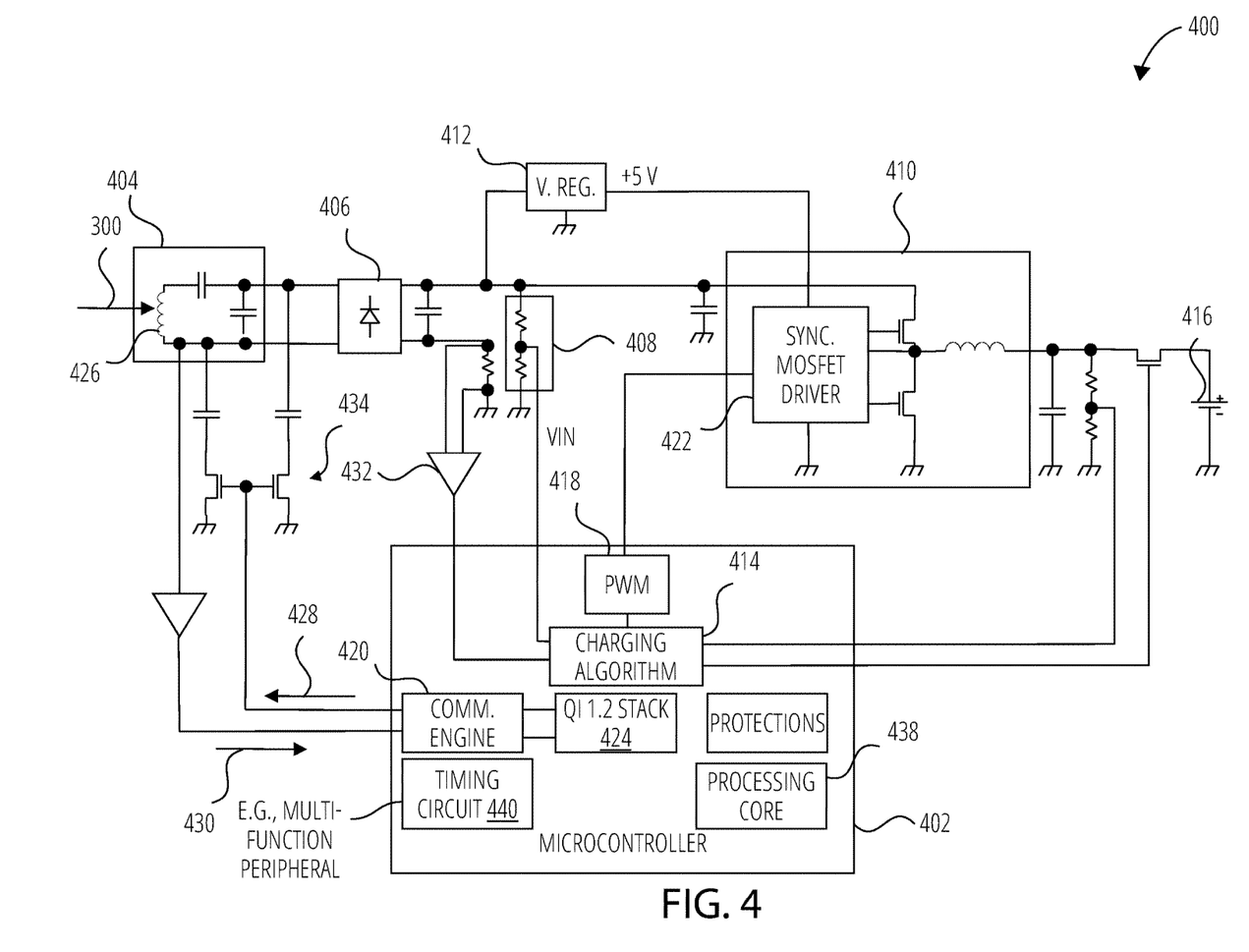
FIG. 4 is a block diagram of a wireless power receiver, according to some examples.

FIG. 4 is a block diagram of a wireless power receiver 400, according to some examples. The wireless power receiver 400 is compatible with Qi 1.2 base stations and is able to draw up to 15 Watts (W) of power, which may be used to run portable devices or charge batteries. The wireless power receiver 400 may be pre-programmed to operate according to Qi protocols to demodulate FSK wireless power signals according to examples disclosed herein, and therefore a user implementing the wireless power receiver 400 into a design for a device may do so without addressing demodulation.

The wireless power receiver 400 includes a synchronous buck converter 410, which may be used to charge batteries 416. As a non-limiting example, the wireless power receiver 400 may include a microcontroller 402, which may be a low-cost, general purpose 8-bit microcontroller. The microcontroller 402 may support a Qi state machine (e.g., using Qi 1.2 stack 424, without limitation), communication (e.g., using communication engine 420, without limitation) to and from a wireless power transmitter (e.g., a charging station, without limitation), a lithium-ion battery charging state machine (e.g., using Li-ion charging algorithm 414, without limitation), and regulation of output voltage and input current of the synchronous buck converter 410 of the wireless power receiver 400 (e.g., using a pulse-width modulator, i.e., PWM 418, without limitation). In some examples, some functionality of the communication engine 420, the Qi 1.2 stack 424, and the Li-ion charging algorithm 414 may be executed by a processing core 438 of the microcontroller 402. In some examples, some of the functionality of the communication engine 420 may be implemented using a timing circuit 440, which may be similar to the timing circuit 106 of FIG. 1. Accordingly, in some examples, the communication engine 420 may operate similarly to the timing circuit 106 and the processing core 108 discussed above with reference to FIG. 1. The communication engine 420 may enable bi-directional communication between the wireless power receiver 400 and a wireless power transmitter (e.g., the wireless power transmitter 102 of FIG. 1). The communication engine 420 may provide an ASK modulation signal 428 used to provide communications to the wireless power transmitter. The communication engine 420 may also demodulate a measurement signal 430 corresponding to the FSK wireless power signal 300, according to various examples disclosed herein, to obtain data bits communicated by the wireless power transmitter. In some examples, the PWM 418 of the microcontroller 402 regulates the input/output parameters of the synchronous buck converter 410. Regulation of the input/output parameters may be performed using PWM, without limitation. In some examples, the regulation of the input/output parameters may be performed by varying a numerically controlled oscillator (NCO) frequency with a fixed on-time (PFM—Pulse Frequency Modulation). Having this much functionality provided by a single component helps drive the cost of a wireless power receiver down and simplifies the design.

The wireless power receiver 400 also includes a resonant tank circuit 404, which includes a receive coil 426 and one or more capacitive elements. A high-frequency signal at the output of the resonant tank circuit 404 may be rectified using a full-bridge rectifier 406 (e.g., implemented with four Schottky diodes, without limitation). An output voltage VIN indicative of a direct current (DC) voltage potential provided by the full-bridge rectifier 406 is measured by the Li-ion charging algorithm 414 of the microcontroller 402 through a resistive divider 408. The rectified DC voltage potential is applied to an input of the synchronous buck converter 410 and a Low Drop-Out (LDO) voltage regulator 412, which LDO voltage regulator 412 supplies power to circuitry of the wireless power receiver 400 (e.g., to the microcontroller 402, an operational amplifier 432, and a synchronous MOSFET driver 422 of the synchronous buck converter 410, without limitation, with connections not shown for simplicity).

Li-ion charging algorithm 414 is implemented in firmware of the microcontroller 402 and handles battery charging functionality. The output voltage potential of the synchronous buck converter 410 is measured and regulated by the microcontroller 402 for limiting charging voltage. The input current is also measured and regulated by the microcontroller 402 using a shunt resistor and the operational amplifier 432. Measurement of the input current enables accurate measurement of input power and enables foreign object detection (FOD) using a power loss method. If the receiver input power is not accurately measured and transmitted as specified by the Qi standard, the charging station may cut power.

As previously discussed, two-way communication is a requirement for the Qi 1.2 protocol. The communication from the wireless power receiver 400 to the charging station is implemented using amplitude shift keying (ASK), as recommended by the standard. Accordingly, the communication engine 420 may provide the ASK modulation signal 428 to two low-power MOSFETs 434 and two capacitors are used to modulate the absorbed power. The communication from the charging station (e.g., the wireless power transmitter 102 of FIG. 1) to the wireless power receiver 400 is implemented using FSK. The FSK wireless power signal 300 is decoded by the microcontroller 402. The communication engine 420 of the microcontroller 402 is configured to enable the two-way communication. By way of non-limiting example, the communication engine 420 may include a timing circuit configured to generate timing data providing timing information regarding like edges of an FSK wireless power signal 300 received from a charging station, responsive to a measurement signal 430 that is indicative of the FSK wireless power signal 300. The processing core 438 of the microcontroller 402 is configured to determine communication bits of the FSK wireless power signal using the communication engine 420 and timing circuit 440, which as indicated above, may be a multi-function peripheral.

Power conversion by the synchronous buck converter 410 is very efficient at full load (e.g., substantially 95% efficient, without limitation) and the input voltage is not critical due to the wide input range. On the other hand, the input current causes power dissipation on the full-bridge rectifier 406 and minimizing the input current is a good way to control the losses. For this reason, the voltage potential at the output of the full-bridge rectifier 406 is regulated at a value that is significantly higher than normal for a linear regulator (e.g., 10V vs. 5V, without limitation) in order to obtain the charging voltage for the battery. Output power is preserved but input current is lower. At fixed intervals, the wireless power receiver 400 sends error packets to the transmitter (e.g., via the ASK modulation signal 428), steering the input voltage to the desired value. The error packets may be made in compliance with Qi 1.2 protocols and may, therefore, be sent responsive to the Qi 1.2 stack 424.

Figure 5:
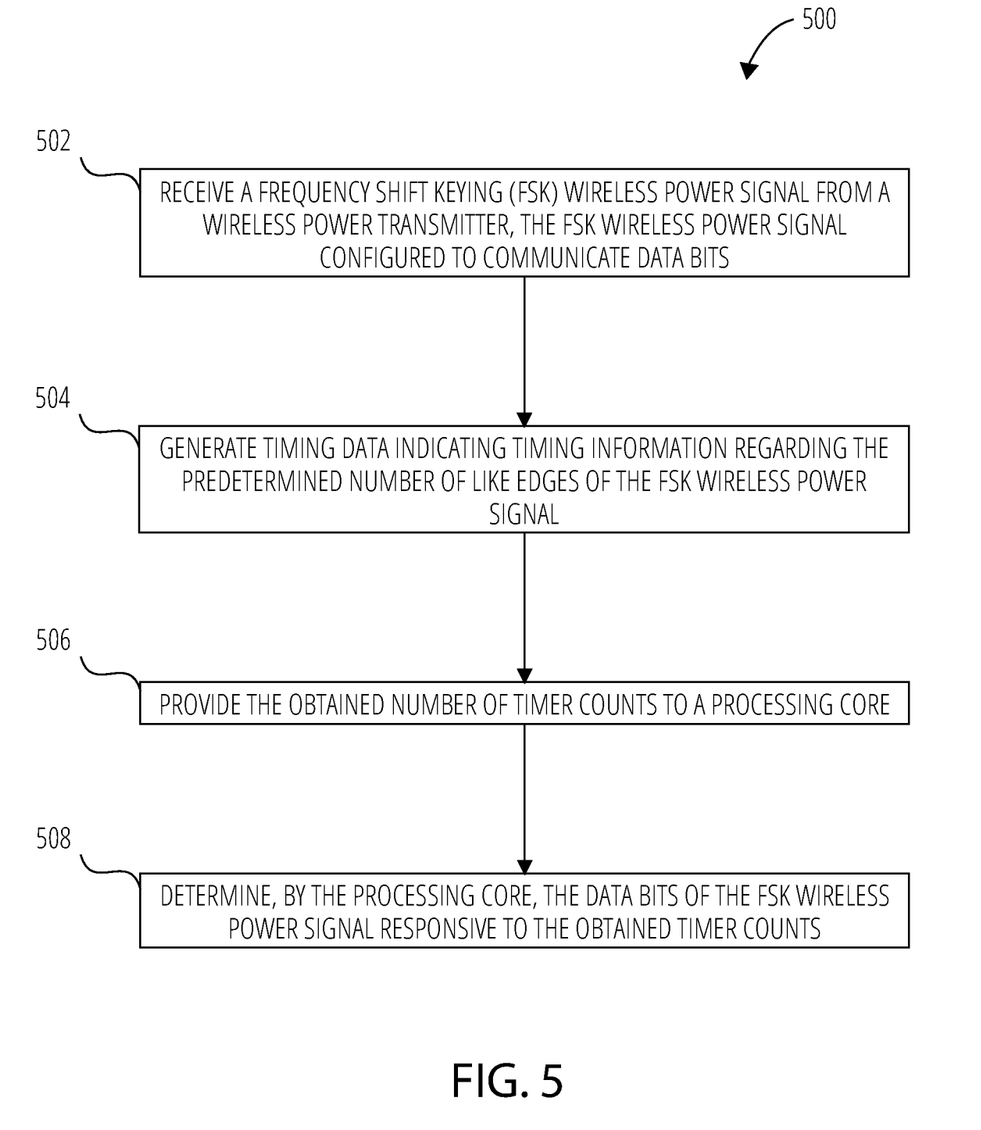
FIG. 5 is a flowchart illustrating a method of operating a wireless power receiver, according to some examples.

FIG. 5 is a flowchart illustrating a method 500 of operating a wireless power receiver, according to some examples. In some examples, the method 500 may be performed by the microcontroller 402 of FIG. 4. At operation 502, the method 500 includes receiving (e.g., by the receive coil 426 of FIG. 4) an FSK wireless power signal (e.g., the FSK wireless power signal 300 of FIG. 3 and FIG. 4, without limitation) from a wireless power transmitter (e.g., the wireless power transmitter 102 of FIG. 1, without limitation). The FSK wireless power signal is configured to communicate data bits.

At operation 504, the method 500 includes generating timing data (e.g., by timing circuit 106 of FIG. 1 or timing circuit 440 of FIG. 4) indicating timing information regarding the predetermined number of like edges of the FSK wireless power signal. In some examples, generating timing information regarding the predetermined number of like edges of the FSK wireless power signal includes obtaining a count of a timer every predetermined number of like edges of the FSK wireless power signal (e.g., between a predetermined number or rising edges or falling edges) of the FSK wireless power signal. At operation 506, the method 500 includes providing (e.g., by the timing circuit 106) the obtained timer counts to a processing core (e.g., the processing core 108 of FIG. 1 or the processing core 438 of FIG. 4). At operation 508, the method 500 includes determining, by the processing core, the data bits of the FSK wireless power signal responsive to the obtained timer counts.

Figure 6:
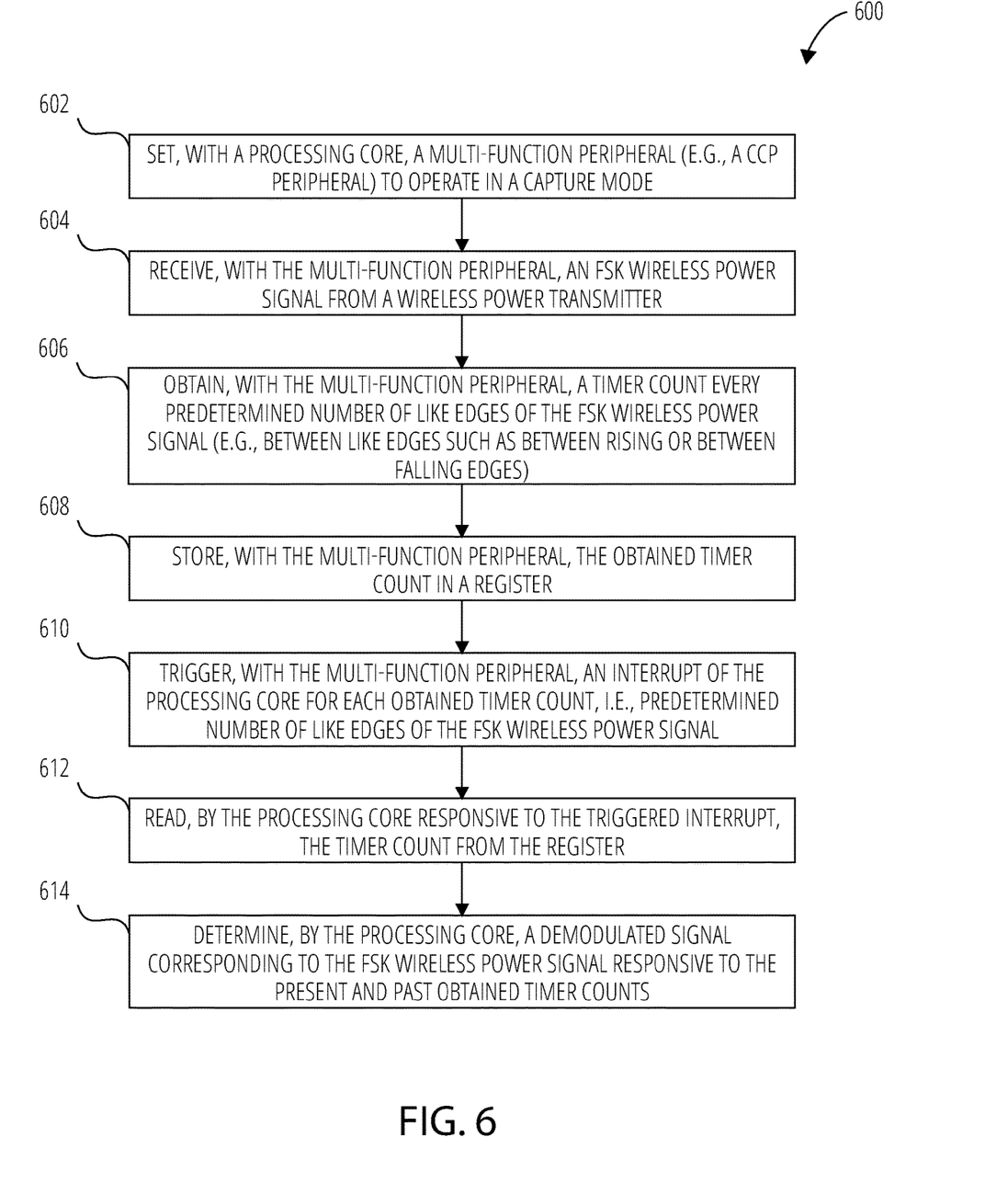
FIG. 6 is a flowchart illustrating a method of operating a wireless power receiver, according to some examples.

FIG. 6 is a flowchart illustrating a method 600 of operating a wireless power receiver, according to some examples. In some examples, the method 600 may be performed by microcontroller 124 of FIG. 1 or the microcontroller 402 of FIG. 4. At operation 602, the method 600 includes setting, with a processing core (e.g., the processing core 108 of FIG. 1 or the processing core 438 of FIG. 4), a multi-function peripheral (e.g., a CCP peripheral, without limitation, implemented by timing circuit 106 of FIG. 1 or timing circuit 440 of FIG. 4) to operate in a capture mode. At operation 604, the method 600 includes receiving, with the multi-function peripheral, an FSK wireless power signal (or a measurement signal indicative of the FSK wireless power signal) from a wireless power transmitter.

At operation 606, the method 600 includes obtaining, with the multi-function peripheral, a timer count every predetermined number of like edges of the FSK wireless (e.g., between like edges such as between rising edges or between falling edges). In some examples, the predetermined number of like edges is 16. In some examples, the timer count is obtained every predetermined number of like edges of the FSK wireless power signal includes obtaining the timer count every predetermined number of like edges of a measurement signal indicative of the FSK wireless power signal. At optional operation 608, the method 600 includes storing, with the multi-function peripheral, the obtained timer count in a register. In some examples, storing the obtained timer count to a register includes storing the obtained timer count to a register in a bank of registers that includes sufficient registers to store obtained timer counts for each sampling interval in a half-bit of data. As a result, in some examples, the obtained timer counts for each sampling interval may be stored in the bank of registers.

At operation 610, the method 600 includes triggering, with the multi-function peripheral, an interrupt of the processing core for each obtained timer count, i.e., predetermined number of like edges of the FSK wireless power signal. In some examples, triggering the interrupt of the processing core for each predetermined number of the edges of the FSK wireless power signal includes triggering the interrupt for every sixteen edges of a measurement signal indicative of the FSK wireless power signal.

At operation 612, the method 600 includes reading, by the processing core responsive to the triggered interrupt, the timer count from the register. At operation 614, the method 600 includes determining, by the processing core, a demodulated signal corresponding to the FSK wireless power signal responsive to the present and past obtained timer counts. In some examples, determining the demodulated signal includes determining frequencies of each half-bit of the FSK wireless power signal. Since the timer counts indicates a number of clock cycles between like edges of the FSK wireless power signal, an amount of time that elapsed between the predetermined number of like edges of the FSK wireless power signal may be determined if the frequency of the clock cycle used by the free running time is known. The amount of time that elapses between the predetermined number of like edges of the FSK wireless power signal would estimate a period of the FSK wireless power signal. An inverse of the period may be taken to obtain the frequency. Thus, the demodulated signal may be obtained by determining the frequency of the FSK wireless power signal for each half-bit of the FSK wireless power signal.

Figure 7:
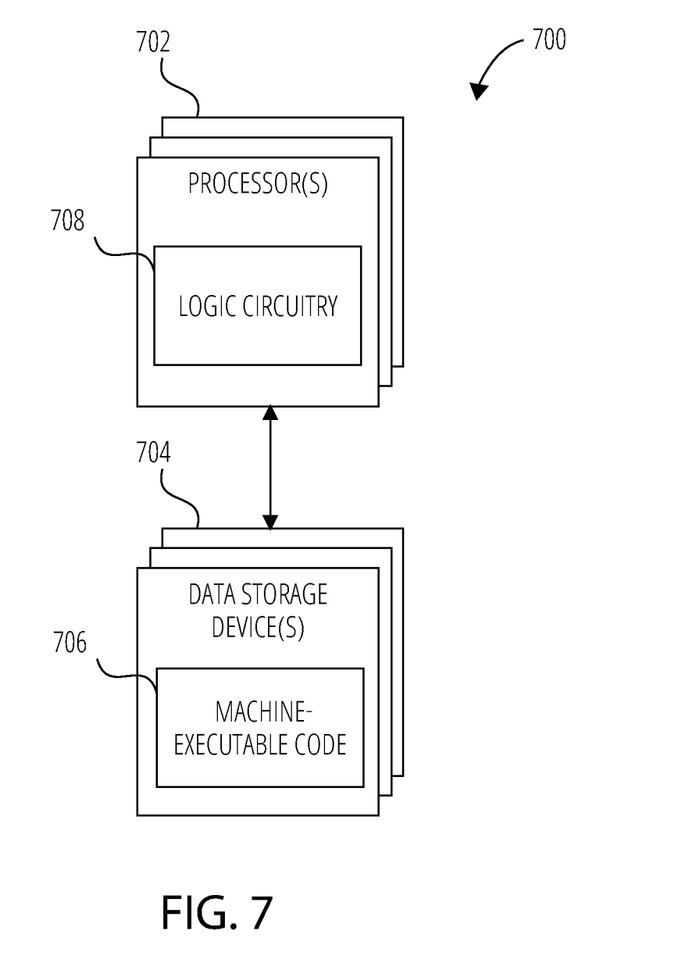
FIG. 7 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 7 illustrates non-limiting examples of implementations of functional elements disclosed herein. In some examples, some or all portions of the functional elements disclosed herein may be performed by hardware specially configured for carrying out the functional elements.

FIG. 7 is a block diagram of circuitry 700 that, in some examples, may be used to implement various functions, operations, acts, processes, and/or methods disclosed herein. The circuitry 700 includes one or more processors 702 (sometimes referred to herein as "processors 702") operably coupled to one or more data storage devices (sometimes referred to herein as "storage 704"). The storage 704 includes machine-executable code 706 stored thereon and the processors 702 include logic circuitry 708. The machine-executable code 706 includes information describing functional elements that may be implemented by (e.g., performed by) the logic circuitry 708. The logic circuitry 708 is adapted to implement (e.g., perform) the functional elements described by the machine-executable code 706. The circuitry 700, when executing the functional elements described by the machine-executable code 706, should be considered as special purpose hardware configured for carrying out functional elements disclosed herein. In some examples, the processors 702 may be configured to perform the functional elements described by the machine-executable code 706 sequentially, concurrently (e.g., on one or more different hardware platforms), or in one or more parallel process streams.

When implemented by logic circuitry 708 of the processors 702, the machine-executable code 706 is configured to adapt the processors 702 to perform operations of examples disclosed herein. For example, the machine-executable code 706 may be configured to adapt the processors 702 to perform at least a portion or a totality of the method 500 of FIG. 5 and/or the method 600 of FIG. 6. As another example, the machine-executable code 706 may be configured to adapt the processors 702 to perform at least a portion or a totality of the operations discussed for the microcontroller 124 of FIG. 1, the microcontroller 402 of FIG. 4, the communication engine 420 of FIG. 4, the processing core 438 of FIG. 4, or combinations thereof. As a specific, non-limiting example, the machine-executable code 706 may be configured to adapt the processors 702 to implement a timing circuit (e.g., the timing circuit 106 of FIG. 1, without limitation) such as a CCP peripheral to a processing core (e.g., the processing core 108 of FIG. 1) of a microcontroller.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 706 (e.g., software code, firmware code, hardware descriptions) related to examples of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some examples, the storage 704 includes volatile data storage (e.g., random-access memory (RAM)), non-volatile data storage (e.g., Flash memory, a hard disc drive, a solid-state drive, erasable programmable read-only memory (EPROM), etc.). In some examples, the processors 702 and the storage 704 may be implemented into a single device (e.g., a semiconductor device product, a system on chip (SOC), etc.). In some examples, the processors 702 and the storage 704 may be implemented into separate devices.

In some examples, the machine-executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transferred to a memory device (not shown) for execution, and executed by the processors 702 using at least the logic circuitry 708. Accordingly, in some examples, the logic circuitry 708 includes electrically configurable logic circuitry 708.

In some examples, the machine-executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples, the machine-executable code 706 may include an HDL, an RTL, a GL description, a mask level description, other hardware description, or any combination thereof.

In examples where the machine-executable code 706 includes a hardware description (at any level of abstraction), a system (not shown, but including the storage 704) may be configured to implement the hardware description described by the machine-executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also, by way of non-limiting example, the logic circuitry 708 may include hard-wired logic manufactured by a manufacturing system (not shown, but including the storage 704) according to the hardware description of the machine-executable code 706.

Regardless of whether the machine-executable code 706 includes computer-readable instructions or a hardware description, the logic circuitry 708 is adapted to perform the functional elements described by the machine-executable code 706 when implementing the functional elements of the machine-executable code 706. It is noted that although a hardware description may not directly describe functional elements, a hardware description indirectly describes functional elements that the hardware elements described by the hardware description are capable of performing.

EXAMPLES

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus for a wireless power receiver, the apparatus comprising: a timing circuit to obtain a timer count every predetermined number of like edges of a frequency shift keying (FSK) wireless power signal, the FSK modulated wireless power signal to communicate data bits; and a processing core separate from the timing circuit, the processing core to determine the data bits of the FSK wireless power signal responsive to the obtained timer counts.

Example 2: The apparatus of Example 1, wherein the timing circuit is implemented as a multi-function peripheral selectively operable, responsive to the processing core, in a capture mode, a compare mode, and a pulse-width-modulation mode.

Example 3: The apparatus of Example 2, wherein the multi-function peripheral is operable in the capture mode to generate the timing data.

Example 4: The apparatus according to any one of Examples 2 and 3, wherein the multi-function peripheral outputs an interrupt to the processing core every predetermined number of like edges of the FSK wireless power signal.

Example 5: The apparatus of Example 4, wherein the processing core samples the respective obtained timer count responsive to the interrupt.

Example 6: The apparatus according to any one of Examples 1-5, wherein the processing core is a processing core of a microcontroller of less than sixteen bits.

Example 7: The apparatus of Example 6, wherein the microcontroller is an eight-bit microcontroller.

Example 8: The apparatus according to any one of Examples 1-7, wherein a frequency of the FSK wireless power signal is between substantially 85 kilohertz and 205 kilohertz.

Example 9: The apparatus according to any one of Examples 1-8, wherein the FSK wireless power signal is encoded using a differential Manchester code.

Example 10: A method of operating a wireless power receiver, the method comprising: receiving a frequency shift keying (FSK) wireless power signal from a wireless power transmitter, the FSK wireless power signal to communicate data bits; obtaining a timer count every predetermined number of like edges of the FSK wireless power signal; providing the obtained timer counts to a processing core; and determining, by the processing core, the data bits of the FSK wireless power signal responsive to the obtained timer counts.

Example 11: A method of operating a wireless power receiver, the method comprising: setting, with a processing core, a peripheral to operate in a capture mode; receiving, with the peripheral, a measurement signal indicative of a frequency shift keying (FSK) wireless power signal from a wireless power transmitter; obtaining a timer count every predetermined number of like edges of the measurement signal; triggering, with the peripheral, an interrupt of the processing core for the every predetermined number of like edges of the measurement signal; reading, by the processing core responsive to a triggered interrupt, the obtained timer counts; and determining, by the processing core, a demodulated signal corresponding to the FSK wireless power signal responsive to the obtained timer counts.

Example 12: The method of Example 11, wherein obtaining a timer count every predetermined number of like edges of the measurement signal comprises obtaining the timer count of a free running counter of the peripheral. Example 12: The method of Example 11, wherein obtaining a timer count every predetermined number of like edges of the measurement signal comprises obtaining the timer count of a free running counter of the peripheral.

Example 13: The method according to any one of Examples 11 and 12, wherein the predetermined number of like edges of the measurement signal is sixteen.

Example 14: The method according to any one of Examples 11-13, wherein the peripheral is a multi-function peripheral selectively operable, responsive to the processing core, in a capture mode, a compare mode, and a pulse-width-modulation mode Example 15: A wireless power receiver, comprising: a receive coil to receive a frequency shift keying (FSK) wireless power signal from a wireless power transmitter, the FSK wireless power signal to communicate data bits; and a microcontroller electrically connected to the receive coil, the microcontroller including: a timing circuit to generate timing information regarding a predetermined number of like edges of the FSK wireless power signal; and a processing core separate from the timing circuit, the processing core to determine the data bits of the FSK wireless power signal responsive to the timing information.

Example 16: The wireless power receiver of Example 15, wherein the timing circuit comprises a multi-function peripheral, wherein the microcontroller is to set the multi-function peripheral to a capture mode to thereby enable the generation of the timing information.

Example 17: The wireless power receiver according to any one of Examples 15 and 16, wherein the microcontroller is an eight-bit microcontroller.

Example 18: The wireless power receiver according to any one of Examples 15-17, wherein the microcontroller is to control charging of a battery.

Example 19: The wireless power receiver according to any one of Examples 15-18, further comprising a synchronous buck converter, wherein the microcontroller is to control the synchronous buck.

Example 20: The wireless power receiver according to any one of Examples 15-19, wherein the microcontroller is configured to modulate a received wireless power signal using amplitude shift keying (ASK) to provide communications to the wireless power transmitter.

Example 21: The wireless power receiver according to any one of Examples 15-20, wherein the timing circuit includes a register to store the generated timing information regarding the predetermined number of like edges of the FSK wireless power signal.

Example 22: An apparatus for a wireless power receiver, the apparatus comprising: a timing circuit configured to generate timing data indicating timing between edges of a frequency shift keying (FSK) modulated wireless power signal, the FSK wireless power signal configured to communicate data bits; and a processing core configured to determine the data bits of the FSK wireless power signal responsive to the timing data.

Example 23: The apparatus of Example 22, wherein the timing circuit includes a capture/compare/pulse-width-modulation (CCP) peripheral.

Example 24: The apparatus of Example 23, wherein the CCP peripheral is configured to operate in a capture mode to generate the timing data.

Example 25: The apparatus according to any one of Examples 23 and 24, wherein the CCP peripheral is configured to trigger an interrupt of the processing core every sixteenth edge of the FSK wireless power signal.

Example 26: The apparatus of Example 25, wherein the processing core is configured to sample the timing data responsive to the interrupt.

Example 27: The apparatus according to any one of Examples 22-26, wherein the processing core includes a microcontroller of less than sixteen bits.

Example 28: The apparatus of Example 27, wherein the microcontroller is an eight-bit microcontroller.

Example 29: The apparatus according to any one of Examples 22-28, wherein a frequency of the FSK wireless power signal is between substantial 85 kilohertz and 205 kilohertz.

Example 30: The apparatus according to any one of Examples 22-29, wherein the FSK wireless power signal is encoded using a differential Manchester code.

Example 31: A method of operating a wireless power receiver, the method comprising: receiving a frequency shift keying (FSK) wireless power signal from a wireless power transmitter, the FSK wireless power signal configured to communicate data bits; generating timing data indicating timing between edges of the FSK wireless power signal; providing the timing data to a processing core; and determining, by the processing core, the data bits of the FSK wireless power signal responsive to the timing data.

Example 32: A method of operating a wireless power receiver, the method comprising: setting, with a processing core, a capture/compare/pulse-width-modulation (CCP) peripheral to operate in a capture mode; receiving, with the CCP peripheral, a frequency shift keying (FSK) wireless power signal from a wireless power transmitter; counting, with the CCP peripheral, a number of timer cycles between edges of the FSK wireless power signal; storing, with the CCP peripheral, timing data indicating the counted number of timer cycles to a register; triggering, with the CCP peripheral, an interrupt of the processing core for each predetermined number of the edges of the FSK wireless power signal; reading, by the processing core responsive to the triggered interrupt, the timing data from the register; and determining, by the processing core, a demodulated signal corresponding to the FSK wireless power signal responsive to the timing data.

Example 33: The method of Example 32, wherein counting the number of timer cycles between edges of the FSK wireless power signal comprises counting the number of timer cycles between rising edges of the FSK wireless power signal.

Example 34: The method according to any one of Examples 32 and 33, wherein triggering the interrupt of the processing core for each predetermined number of the edges of the FSK wireless power signal comprises triggering the interrupt for every sixteen edges of the FSK wireless power signal.

Example 35: A wireless power receiver, comprising: a receive coil configured to receive a frequency shift keying (FSK) wireless power signal from a wireless power transmitter, the FSK wireless power signal configured to communicate data bits; and a microcontroller electrically connected to the receive coil, the microcontroller including: a timing circuit configured to generate timing data indicating timing between edges of the FSK wireless power signal; and a processing core configured to determine the data bits of the FSK wireless power signal responsive to the timing data.

Example 36: The wireless power receiver of Example 35, wherein the timing circuit comprises a capture/compare/pulse-width-modulation (CCP) peripheral.

Example 37: The wireless power receiver according to any one of Examples 35 and 36, wherein the microcontroller is an eight-bit or less microcontroller.

Example 38: A method of operating a wireless power receiver, the method comprising: retrieving, with a CCP peripheral, a timer value based on a signal event, the timer including a free running timer based on an internal microcontroller clock, the signal event including like edges of a measurement signal indicative of an FSK wireless power signal; taking the measurement signal as an input to a CCP pin; operating the CCP peripheral in a "capture mode, every $16^{th}$ rising edge" setting of the CCP peripheral; obtaining, with the CCP peripheral, the timer value every $16^{th}$ like edge of the measurement signal; storing the timer value in a register supplied in the CCP peripheral; outputting an interrupt every $16^{th}$ like edge of the measurement signal; retrieving, with a processing core, the timer value from the register responsive to the interrupt; and determining, by the processing core, a frequency of a half bit of the measurement signal responsive to the retrieved timer value and a known frequency of the internal microcontroller clock driving the free running timer. An average of differences between timer values for multiple (e.g., 16 values including a current value and the past 15 values) sampling intervals of the half bit may be used to determine the half bit of the measurement signal.

Example 39: A wireless power receiver including a CCP peripheral and a processing core; the CCP peripheral, in a capture mode, retrieves a timer value based on a signal event, the signal event including one of a rising edge or a falling edge of a measurement signal indicative of an FSK wireless power signal, the timer including a free running timer based on an internal microcontroller clock; the CCP peripheral takes the measurement signal as an input to a CCP pin of the CCP peripheral; the CCP peripheral uses a "capture mode: every $16^{th}$ rising edge" setting; the CCP peripheral obtains the timer value on every $16^{th}$ edge of the measurement signal, stores the timer value in a register of the CCP peripheral, and outputs an interrupt. The processing core retrieves the timer value from the register and determines a frequency of a half bit of the measurement signal responsive to a current timer value, substantially 15 previous timer values, and a known internal microcontroller clock frequency of the free running timer. An average of differences between the timer values (e.g., for substantially 16 sampling intervals) may be used in the determination.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus for a wireless power receiver, the apparatus comprising:
    a multi-function peripheral including a timing circuit, the multi-function peripheral to selectively operate in a capture mode to obtain a timer count and trigger an interrupt to a processing core every predetermined number of like edges of a frequency shift keying (FSK) wireless power signal, the FSK wireless power signal to communicate data bits; and
    the processing core separate from the multi-function peripheral, the processing core to set the multi-function peripheral in the capture mode, read the obtained timer counts responsive to the triggered interrupts, and determine the data bits of the FSK wireless power signal responsive to the obtained timer counts.

2. The apparatus of claim 1, wherein the multi-function peripheral is selectively operable, responsive to the processing core, in the capture mode, a compare mode, and a pulse-width-modulation mode.

3. The apparatus of claim 2, wherein the multi-function peripheral is operable in the capture mode to generate the timer count.

4. The apparatus of claim 2, wherein the predetermined number of like edges of the FSK wireless power signal is sixteen.

5. The apparatus of claim 1, wherein the processing core samples respective obtained timer counts responsive to respective triggered interrupts.

6. The apparatus of claim 1, wherein the processing core is a processing core of a microcontroller of less than sixteen bits.

7. The apparatus of claim 6, wherein the microcontroller is an eight-bit microcontroller.

8. The apparatus of claim 1, wherein a frequency of the FSK wireless power signal is between substantially 85 kilohertz and 205 kilohertz.

9. The apparatus of claim 1, wherein the FSK wireless power signal is encoded using a differential Manchester code.

10. A method of operating a wireless power receiver, the method comprising:
    at a multi-function peripheral including a timing circuit, operating in a capture mode responsive to a setting from a processing core;

receiving a frequency shift keying (FSK) wireless power signal from a wireless power transmitter, the FSK wireless power signal to communicate data bits;

obtaining a timer count and triggering an interrupt to the processing core every predetermined number of like edges of the FSK wireless power signal; and providing the obtained timer counts to the processing core via the triggered interrupts;

at the processing core, setting the multi-function peripheral to operate in the capture mode;

reading the obtained timer counts responsive to the triggered interrupts; and determining the data bits of the FSK wireless power signal responsive to the obtained timer counts.

11. A method of operating a wireless power receiver, the method comprising:

setting, with a processing core, a peripheral to operate in a capture mode;

receiving, with the peripheral, a measurement signal indicative of a frequency shift keying (FSK) wireless power signal from a wireless power transmitter;

obtaining a timer count every predetermined number of like edges of the measurement signal;

triggering, with the peripheral, an interrupt of the processing core for the every predetermined number of like edges of the measurement signal;

reading, by the processing core responsive to a triggered interrupt, the obtained timer counts; and determining, by the processing core, a demodulated signal corresponding to the FSK wireless power signal responsive to the obtained timer counts.

12. The method of claim 11, wherein obtaining a timer count every predetermined number of like edges of the measurement signal comprises obtaining the timer count of a free running counter of the peripheral.

13. The method of claim 11, wherein the predetermined number of like edges of the measurement signal is sixteen.

14. The method of claim 11, wherein the peripheral is a multi-function peripheral selectively operable, responsive to the processing core, in a capture mode, a compare mode, and a pulse-width-modulation mode.

15. A wireless power receiver, comprising:

a receive coil to receive a frequency shift keying (FSK) wireless power signal from a wireless power transmitter, the FSK wireless power signal to communicate data bits; and a microcontroller electrically connected to the receive coil, the microcontroller including:

a multi-function peripheral including a timing circuit, the multi-function peripheral to selectively operate in a capture mode to generate timing information and trigger an interrupt to a processing core every predetermined number of like edges of the FSK wireless power signal; and the processing core separate from the multi-function peripheral, the processing core to set the multi-function peripheral in the capture mode, read the generated timing information responsive to the triggered interrupts, and determine the data bits of the FSK wireless power signal responsive to the timing information.

16. The wireless power receiver of claim 15, wherein the multi-function peripheral is selectively operable, responsive to the processing core, in the capture mode, a compare mode, and a pulse-width-modulation mode.

17. The wireless power receiver of claim 15, wherein the microcontroller is an eight-bit microcontroller.

18. The wireless power receiver of claim 15, wherein the microcontroller is to control charging of a battery.

19. The wireless power receiver of claim 15, further comprising a synchronous buck converter, wherein the microcontroller is to control the synchronous buck converter.

20. The wireless power receiver of claim 15, wherein the microcontroller is configured to modulate a received wireless power signal using amplitude shift keying (ASK) to provide communications to the wireless power transmitter.

21. The wireless power receiver of claim 15, wherein the timing circuit includes a register to store the generated timing information regarding the predetermined number of like edges of the FSK wireless power signal.

* * * * *

UNITED STATES PATENT AND TRADEMARK OFFICE
CERTIFICATE OF CORRECTION

| | |
|---|---|
| PATENT NO. | : 12,184,095 B2 |
| APPLICATION NO. | : 17/445298 |
| DATED | : December 31, 2024 |
| INVENTOR(S) | : Mihnea Rosu-Hamzescu, Sergiu Oprea and Marius Dracea |

Page 1 of 1

It is certified that error appears in the above-identified patent and that said Letters Patent is hereby corrected as shown below:

In the Specification

Column 7, Line 62, change ""zero" "one," "zero" "one," "one" "zero," "zero."" to --"zero," "one," "zero," "one," "one," "zero," "zero."--

Column 16, Lines 31-35, change "of the peripheral. Example 12: The method of Example 11, wherein obtaining a timer count every predetermined number of like edges of the measurement signal comprises obtaining the timer count of a free running counter of the peripheral." to --of the peripheral.--

Signed and Sealed this
First Day of April, 2025

Coke Morgan Stewart
*Acting Director of the United States Patent and Trademark Office*